Patented Dec. 18, 1923.

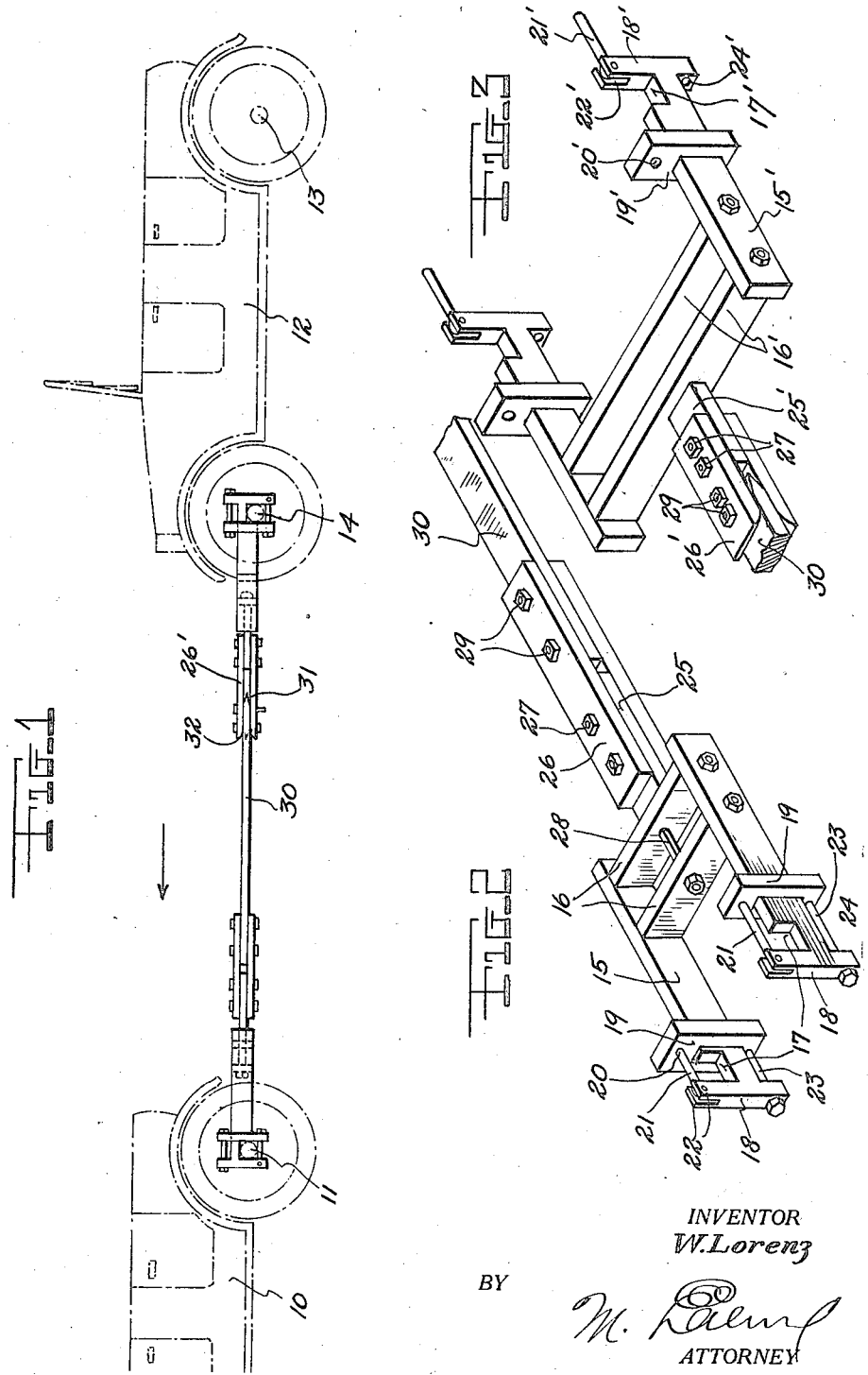

1,478,041

UNITED STATES PATENT OFFICE.

WILHELM LORENZ, OF FARMINGTON, MISSOURI.

VEHICLE TOWING FRAME.

Application filed September 26, 1922. Serial No. 590,570.

*To all whom it may concern:*

Be it known that I, WILHELM LORENZ, a citizen of the United States, residing at Farmington, in the county of Saint Francois and State of Missouri, have invented certain new and useful Improvements in Vehicle Towing Frames, of which the following is a specification.

The invention relates to devices for assisting in the transportation of self propelled vehicles when temporarily unable to run under their own power.

The main object of the invention is to provide a stiff and rigid frame which may be clamped to portions of the rear axle of the towing vehicle, extended rearward to the powerless vehicle and engage its front steering knuckles in such manner as to prevent their turning on their vertical axle in towing the car.

A further purpose is to provide such an apparatus which may be separated into relatively short elements, permitting ready transportation and assembling when required.

These objects are attained by the novel construction, combination and arrangement of parts hereafter described and shown in the accompanying drawing, forming a material part of this disclosure, and in which:—

Figure 1 is a side elevational view showing an embodiment of the device as attached between two conventional types of automobiles, the same being shown in broken lines.

Figure 2 is a perspective view of the front portion of the device in detail.

Figure 3 is a similar view of the rear portion of the same.

In the drawing, the numeral 10 designates the front or towing car, the rear portion of which is shown by broken lines and 11 its rear axle.

Similarly the numeral 12 indicates in general the car to be hauled, the same resting on a rear axle 13 and front axle 14, each car being complete in itself and of any of the usual types.

A pair of bars 15, rigidly held in spaced parallel relation to their rear ends by transverse bars 16, contain notches 17 in their upper front edges adapted to engage the axle 11, there being vertical extensions 18 at their front extremities.

Fitted to slide on the bars 15 are yokes 19 containing holes 20 in which may be entered tongues 21 pivoted between forks 22 formed at the ends of the extensions 18, and bolts 23, passing through holes 24 in opposite ends of the extensions engage the yokes, forming closures which can be quickly and firmly fixed to the axle.

A similar structure is provided to engage the front axle of the rear car, the same being given like designating characters having exponents, the only difference being in the relative length of the cross bars 16', these attaching frames being solidly clamped by bolts as shown.

Engaged with the outer cross bars 16 and 16' are strips 25 and 25' respectively, on each side of which are cleats 26 and 26' secured by bolts 27, said strips being further held to the frames by nonrotatable square bolts 28 passing through the bars 16.

Other bolts 29 connect between the pairs of cleats a beam or reach rod 30, its front edge 31 being bevelled from both sides to readily enter between the bevelled ends 32 of the cleats 26', thus rendering the device readily connected.

Therefore if the car be so injured as to prevent its usual operation, the clamp structure may be firmly secured to its front axle, and the forwardly extending elements engaged with the rear axle of the towing vehicle so as to be compelled to advance in a straight path.

Having thus described my invention, what I claim as new and desire to secure by Letters Patent, is:—

A towing frame comprising a reach rod, yokes at each end thereof, each of said yokes consisting of two rigid rectangular bars spaced in parallel, notched at their outer portions to receive an axle and having rigid vertical members at their end, said members having forks on one end, tongues pivoted in the forks, slides mounted on said bars, said slides having openings receptive of the ends of said tongues when turned over an axle in the notches, and means for securing said slides in engagement with said tongues.

In witness whereof I have affixed my signature.

WILHELM LORENZ.